United States Patent
Granz et al.

(10) Patent No.: US 10,366,726 B1
(45) Date of Patent: Jul. 30, 2019

(54) INTERLACED MAGNETIC RECORDING IN WITH MULTIPLE INDEPENDENT-ACTUATORS HAVING RESPECTIVE INDEPENDENT HEADS

(71) Applicant: Seagate Technology LLC, Cupertino, CA (US)

(72) Inventors: Steven Douglas Granz, Shakopee, MN (US); Mehmet Fatih Erden, St. Louis Park, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/939,493

(22) Filed: Mar. 29, 2018

(51) Int. Cl.
- *G11B 5/55* (2006.01)
- *G11B 33/14* (2006.01)
- *G11B 25/04* (2006.01)
- *G11B 5/00* (2006.01)
- *G11B 5/54* (2006.01)

(52) U.S. Cl.
CPC .......... *G11B 33/148* (2013.01); *G11B 5/5578* (2013.01); *G11B 25/043* (2013.01); *G11B 5/54* (2013.01); *G11B 2005/0021* (2013.01)

(58) Field of Classification Search
None
See application file for complete search history.

(56) References Cited

U.S. PATENT DOCUMENTS

| | | |
|---|---|---|
| 4,577,240 A | 3/1986 | Hedberg et al. |
| 4,751,596 A | 6/1988 | Rohart |
| 4,823,196 A | 4/1989 | Goddard |
| 4,972,396 A | 11/1990 | Rafner |
| 5,081,552 A | 1/1992 | Glaser et al. |
| 5,202,799 A | 4/1993 | Hetzler et al. |
| 5,223,993 A | 6/1993 | Squires et al. |
| 5,293,282 A | 3/1994 | Squires et al. |
| 5,343,347 A | 8/1994 | Gilovich |
| 5,523,901 A | 6/1996 | Anderson et al. |
| 6,057,990 A | 5/2000 | Gilovich |
| 6,081,399 A | 6/2000 | Lee et al. |
| 6,185,063 B1 | 2/2001 | Cameron |
| 6,317,282 B1 | 11/2001 | Nam |
| 6,483,654 B2 | 11/2002 | Nam |
| 6,502,178 B1 | 12/2002 | Olbrich |
| 6,658,201 B1 | 12/2003 | Rebalski |
| 6,690,549 B1 | 2/2004 | Aikawa et al. |
| 6,735,032 B2 | 5/2004 | Dunn et al. |
| 6,883,062 B2 | 4/2005 | Susnjar |

(Continued)

FOREIGN PATENT DOCUMENTS

JP 10208411 8/1998

OTHER PUBLICATIONS

U.S. Appl. No. 15/381,016, Zhu et al., filed Dec. 15, 2016.
(Continued)

*Primary Examiner* — Tan X Dinh
(74) *Attorney, Agent, or Firm* — Hollingsworth Davis, LLC (57) ABSTRACT

A first set of bottom tracks is written via a first head that is moved via a first actuator over a surface of a disk. A second set of top tracks interlaced between and partially overlapping the bottom tracks via a second head that is moved via a second actuator over the surface of the disk independently of the first actuator and first head.

20 Claims, 6 Drawing Sheets

(56) References Cited

U.S. PATENT DOCUMENTS

| | | |
|---|---|---|
| 7,102,842 B1 | 9/2006 | Howard |
| 7,123,435 B1 | 10/2006 | Schreck |
| 7,146,623 B2 | 12/2006 | Kuwajima et al. |
| 7,315,429 B2 | 1/2008 | van Zyl |
| 7,379,257 B2 | 5/2008 | Yamagishi |
| 7,385,781 B1 | 6/2008 | Craig et al. |
| 7,430,091 B2 | 9/2008 | Manasse |
| 7,679,851 B1 | 3/2010 | Sun et al. |
| 7,710,683 B2 | 5/2010 | Craig et al. |
| 8,223,451 B2 | 7/2012 | Breslau et al. |
| 8,351,147 B2 | 1/2013 | Breslau et al. |
| 8,699,175 B1 | 4/2014 | Olds et al. |
| 8,953,276 B1 | 2/2015 | Pokharel et al. |
| 9,099,103 B1 * | 8/2015 | Krichevsky ............ G11B 5/012 |
| 9,418,688 B1 * | 8/2016 | Rausch ................ G11B 5/3967 |
| 9,472,223 B1 * | 10/2016 | Mendonsa ......... G11B 5/59638 |
| 9,508,362 B2 * | 11/2016 | Gao .......................... G11B 5/09 |
| 9,508,370 B1 | 11/2016 | Zhu et al. |
| 9,570,104 B1 | 2/2017 | Erden et al. |
| 9,633,675 B2 * | 4/2017 | Zhu .......................... G11B 5/09 |
| 9,666,213 B1 * | 5/2017 | Erden ................ G11B 20/1217 |
| 9,830,939 B1 | 11/2017 | Hamilton |
| 9,830,944 B1 * | 11/2017 | Mendonsa ............ G11B 5/6011 |
| 10,037,779 B1 * | 7/2018 | Mendonsa ............. G11B 21/08 |
| 10,068,597 B1 * | 9/2018 | Jury ...................... G11B 5/4886 |
| 2004/0179465 A1 | 9/2004 | Kuwajima et al. |
| 2008/0123213 A1 | 5/2008 | Craig et al. |
| 2008/0239554 A1 | 10/2008 | Takeda et al. |
| 2012/0250177 A1 | 10/2012 | Somanache et al. |
| 2016/0147650 A1 * | 5/2016 | Gao .................... G06F 12/0238 711/4 |
| 2016/0148630 A1 * | 5/2016 | Rausch ..................... G11B 5/09 360/77.02 |
| 2016/0148636 A1 * | 5/2016 | Ma ........................... G11B 5/09 369/13.26 |
| 2016/0148637 A1 * | 5/2016 | Rausch .................... G11B 5/09 369/13.26 |
| 2016/0148641 A1 * | 5/2016 | Gao ......................... G11B 5/09 369/13.35 |
| 2017/0168908 A1 | 6/2017 | Abali et al. |
| 2017/0330587 A1 * | 11/2017 | Gao .................. G11B 20/1217 |

OTHER PUBLICATIONS

U.S. Appl. No. 15/939,502, Granz et al., filed Mar. 29, 2018.
File History for U.S. Appl. No. 15/381,016 as retrieved from the U.S. Patent and Trademark Office.
File History for U.S. Appl. No. 15/939,502 as retrieved from the U.S. Patent and Trademark Office.

* cited by examiner

INTERLACED MAGNETIC RECORDING IN WITH MULTIPLE INDEPENDENT-ACTUATORS HAVING RESPECTIVE INDEPENDENT HEADS

SUMMARY

The present disclosure is directed to interlaced magnetic recording in a multiple-actuator drive. In one embodiment, a first set of bottom tracks is written via a first head that is moved via a first actuator over a surface of a disk. A second set of top tracks interlaced between and partially overlapping the bottom tracks via a second head that is moved via a second actuator over the surface of the disk independently of the first actuator and first head.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., hard disk drives (HDDs). Additional HDD features described herein, generally described as "parallelism" architectures are seen as a way to increase HDD performance measures such as data throughput and latency. Generally, parallelism architectures operate multiple read/write heads in parallel. Such parallelism can increase the rate of input/output operations (IOPS) and thereby speed up certain operations. For example, the data read from two heads can be combined together into a single stream, thereby doubling the throughput rate of data sent to the host. In other examples, different heads can service different read or write requests at the same time, thereby reducing overall latency, e.g., for multiple simultaneous random data access requests.

In embodiments described below, a hard disk drive includes multiple heads driven by different actuators that can read from or write to one or more disks simultaneously. This may include separate and independent reading/writing, such as heads that are servicing different read/write requests. This may also include separate and dependent reading/writing, e.g., where parts of a single stream of data are being handled by different heads at the same time. In either case, the head and actuators themselves are operating independently, although in coordination in the latter case. The parallelism architectures may be extended to other components that operate in the HDD, including system controllers, servo controllers, read/write channels, host interfaces, caches, etc.

While parallelism is generally considered a technique to increase data throughput, as described below it may also be used to increase areal density. A number of technologies are being implemented or are in development to continue increasing areal density thereby increasing drive capacity for drives having approximately the same size and cost. Some of these technologies enable writing smaller bits to relatively high coercivity media, thereby overcoming the superparamagnetic effect that would otherwise cause the smaller bits to randomly flip orientation. For example, heat-assisted magnetic recording (HAMR) and microwave-assisted magnetic recording (MAMR) respectively use light and microwave energy to assist in writing smaller bits to high coercivity media. In a HAMR drive, laser light is used to create a hotspot on the magnetic media while recording. This hotspot lowers the coercivity of the material allowing a write coil to change direction. In a MAMR drive, a spin torque oscillator increases the strength of the field produced by the write coil thereby allowing recording to high coercivity media.

Other techniques for increasing areal density involve changing the way tracks are recorded, thereby allowing narrower tracks to be written than would be possible using conventional track layouts and conventional write transducers. Two examples of this are shingled magnetic recording (SMR) and interlaced magnetic recording (IMR). Both of these reduce track widths by recording a first track (e.g., using a relatively strong magnetic field which results in a wider than normal track width) and then recording a second track partially overlapping the first track, thereby reducing the width of the first track. An SMR drive records a series of tracks each overlapping the next, with the last track in the series being written at the wider than normal width and not being overlapped. An IMR drive records wider tracks at about a 2× track pitch, and then writes narrower tracks between the wider tracks, the narrow tracks overlapping one or both adjacent wider tracks in which they are interlaced.

Both SMR and IMR can be implemented using existing recording heads, generally referred to herein as perpendicular magnetic recording (PMR), as well as with HAMR and MAMR. One issue that arises with SMR and IMR is that tracks that are overlapped by other tracks cannot be randomly updated efficiently, as changing the track data involves rewriting any overlapping tracks. This impacts IMR less, as half of the tracks (the top tracks) can be randomly updated without significant overhead as they are not overlapped by any other tracks. In contrast, SMR can only randomly update the top track in an overlapping set without overhead. If a series of n-tracks are written by shingling over each other, n−1 of the tracks will typically involve rewriting at least one overlapping track to update the data in the track.

One issue that complicates implementing IMR using conventional read/write heads relates to the different tracks widths that may be used for top and bottom tracks. In a PMR drive, this may require using two different writer coils and poles in one read/write head, each configured for a different write width. While this is feasible, it can increase costs as it may require more complicated write channels and may reduce manufacturing yields of the heads. For HAMR, these different track widths may be achieved by changing laser power to change a size of the hotspot. Even so, it is desirable to enable writing IMR tracks using a PMR (or HAMR or MAMR) head with a single write transducer.

In embodiments described below, a drive can utilize a multiple-actuator arrangement that facilitates writing different-width IMR tracks using different heads. This allows using heads that each have only a single write transducer, which can increase areal density without significant per-head production costs. Such a drive can offer other benefits associated with parallelism, such as faster throughput, faster random updates, simultaneous reading and writing. The embodiments below may be used with PMR, HAMR, MAMR and other technologies as will be described below.

Figure 1:
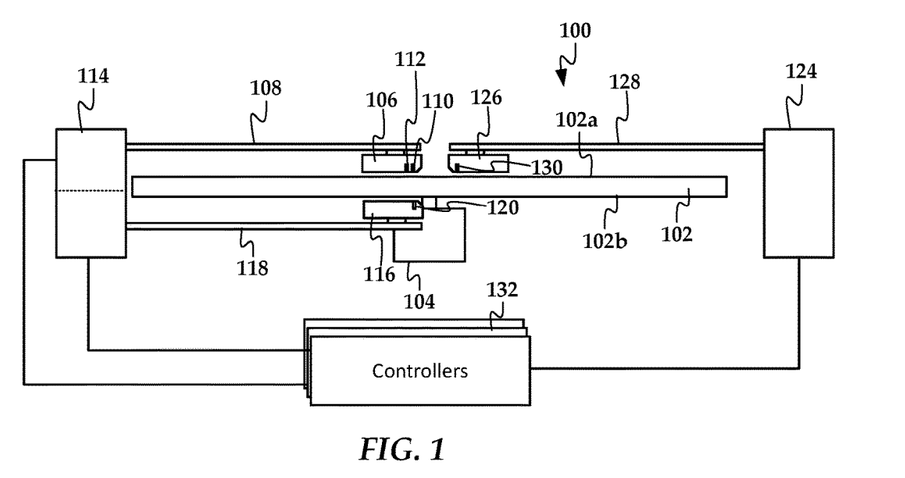
FIG. 1 is a diagram of an apparatus according to an example embodiment.

In FIG. 1, a diagram illustrates an apparatus 100 (e.g., data storage drive) with parallelism features according to example embodiments. The apparatus 100 includes at least one magnetic disk 102 driven by a spindle motor 104. A slider 106 (also referred to as a head, read/write head, read head, write head, recording head, etc.) is held over a first surface 102a of the disk 102 by an arm 108. An actuator 114 moves (e.g., rotates) the arm 108 to place the slider 106 over different tracks on the disk 102. The slider includes a read transducer 110 and/or a write transducer 112. The read transducer 110 provides a signal in response to changing magnetic fields on the disk 102, and is coupled to a controller (not shown) where the separate signals are independently processed. The write transducer 112 receives signals from the controller and converts them to magnetic fields that change magnetic orientations of regions on the disk 102.

The apparatus 100 includes a second slider 116 supported by a second arm 118. The second slider 116 is held over a second surface 102b of the disk 102 and actuator 114 causes the second arm 118 to move to different tracks on the disk 102. The arm 118 may move together with arm 108, or the arms 108, 118 may move independently (as indicated by dashed line on actuator 114 indicating a split actuator). In either configuration, the arms 108, 118 rotate around the same axis. The slider 116 also includes read and/or write transducers 120. The transducers 120 are capable of reading from and/or writing to disk surface 102b simultaneously with one or both of read/write transducers 110, 112 that access disk surface 102a.

In another embodiment, the apparatus 100 includes a third slider 126 supported by a third arm 128. The third slider 126 (and its associated actuation hardware) may be included instead of or in addition to the second slider 116. The third slider 126 is held over the first surface 102a of the disk 102 as a second actuator 124 causes the third arm 118 to move to different tracks on the disk 102. The arm 128 and actuator 124 move independently of arm 108 and actuator 114. The slider 126 includes read and/or write transducers 130. The transducers 130 are capable of reading from and/or writing to disk surface 102a simultaneously with transducers 110, 112 of first slider 106.

In the examples shown in FIG. 1, more than one disk 102 may be used, and the actuators 114, 124 may be coupled to additional arms and heads that simultaneously access some or all of the additional disk surfaces. In this context, "accessing" generally refers to electrically activating a read or write transducer and coupling the transducer to a read/write channel to facilitate reading from and writing to the disk. Independently movable heads that utilize a split actuator 114 may generally simultaneously access different surfaces, e.g., heads 106 and 116 access different surfaces 102a, 102b at the same time. Independently movable heads that utilize non-coaxial actuators 114, 124 may access the same surface at the same time, e.g., heads 106 and 126 may both access surface 102a at the same time.

One or more controllers 132 are coupled to the respective actuators 114, 124 and control movement of the actuators 114, 124. The controllers 132 may include systems on a chip that perform such operations as servo control, encoding and decoding of data written to and read from the disk 102, queuing and formatting host commands, etc. As pertains to the discussion below, the one or more controllers 132 have the ability to execute multiple media read/write operations concurrently.

Figure 2:
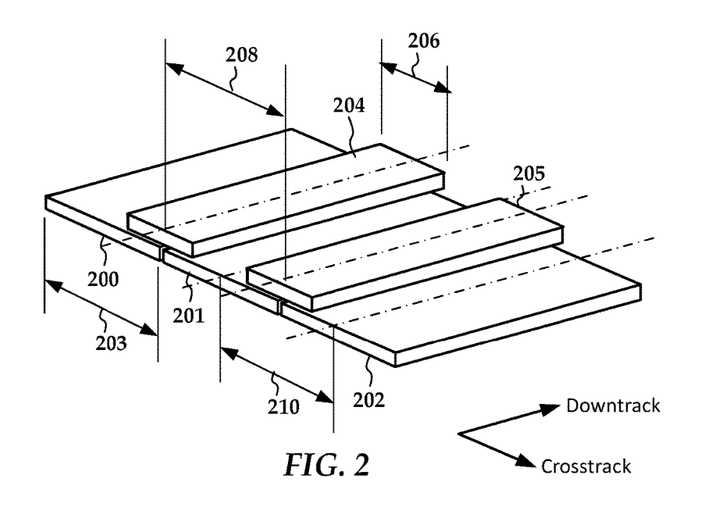
FIG. 2 is a diagram showing interlaced tracks according to an example embodiment.

As noted above, the apparatus 100 in FIG. 1 is configured to write different-width IMR tracks via two different heads 106, 126 that access the same surface 102a. In FIG. 2, a block diagram illustrates IMR tracks according to an example embodiment. In this IMR process, bottom tracks 200-202 are first written on the recording medium using a bottom track width 203 and at bottom track pitch 210. Top tracks 204, 205 are then written partially overlapping between respective bottom tracks 200-202, and therefore are interlaced between the bottom tracks 200-202. The top tracks are written at a top track width 206 and at top track pitch 208. This sequence can be repeated for any number of top and bottom tracks.

Because the bottom tracks 200-202 are written at a relatively large crosstrack separation from one another, the bottom tracks 200-202 can be written using a relatively larger width 203 than the top tracks 204, 205 without risk of adjacent track erasure or interference. The larger width 203 enables recording the bottom tracks 200-202 at relatively higher linear bit density than that of the top tracks 204, 205. For a multiple-actuator device, the different widths 203, 206 can be achieved by writing bottom tracks 200-202 with a different recording head than top tracks 204, 205. The width and linear bit density of the top and bottom tracks 204, 205, 200-202 define the bit aspect ratio (BAR) of the respective tracks.

Because individual recording heads and media will have different characteristics due to manufacturing tolerances, each drive may have different top and bottom BAR values that are optimum. In some cases, BAR may be different for different disk surfaces within a drive, and different for different zones within a disk surface. In A selected combination of adjacent track spacing (TPI) and linear bit density (BPI) will produce a selected BAR for a particular recoding regions. The combination of BPI and TPI defines the areal density (ADC) for the region being considered.

Figure 3:
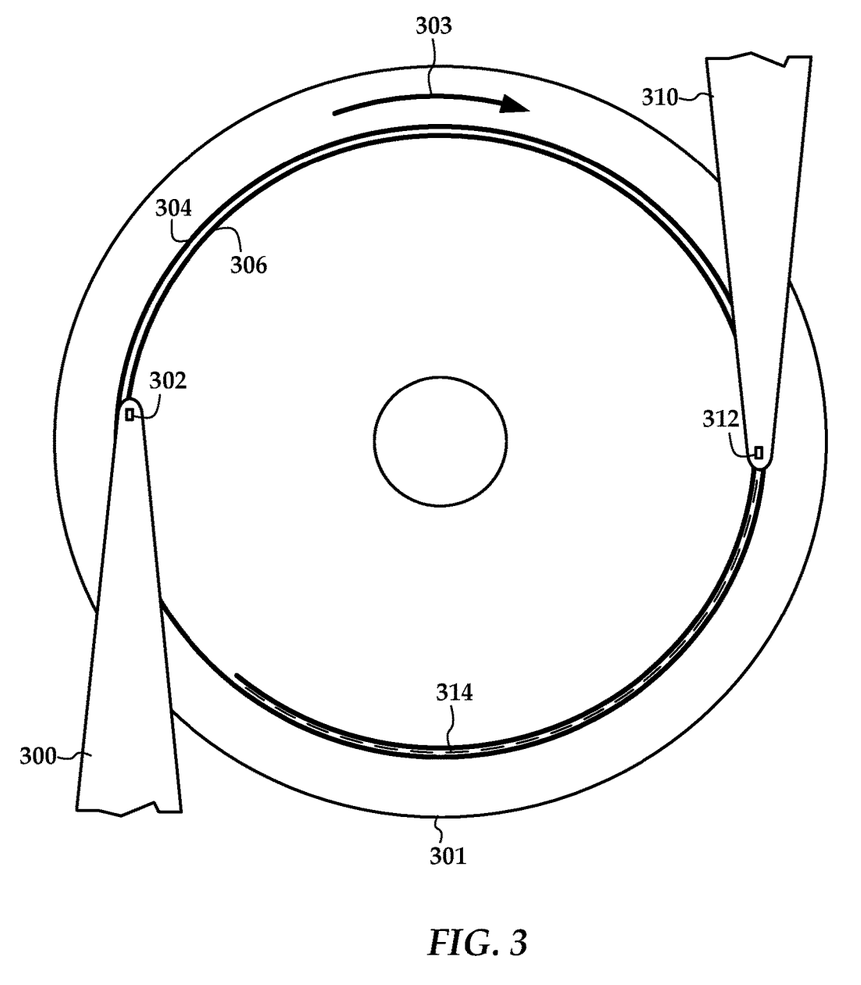
FIG. 3 is a diagram of showing first and second heads writing interlaced tracks according to an example embodiment.

In FIG. 3, a diagram illustrates an example of how IMR tracks may be written and read by a multi-actuator drive according to an example embodiment. In this example, arms 300, 310 are driven by different actuators (not shown) and move first and second heads 302, 312 across one surface of a disk 301. The disk 301 is rotating in a clockwise direction as indicated by arrow 303. Head 302 is configured, e.g., with a wide crosstrack write profile, to write bottom IMR tracks 304, 306. In this example track 304 has already been written and track 306 has been partially written. Head 312 is configured, e.g., with a relatively narrower crosstrack write profile, to write top IMR track 314 (drawn with a dashed line style). Because head 312 is rotationally offset from head 302 by approximately 180 degrees, the head 312 has only partially written track 314, which is interlaced between and partially overlaps tracks 304 and 306.

Note that the heads 302, 312 may also have different read transducers that are optimized for the different track sizes, e.g., head 302 is optimized to read bottom tracks 304, 306 and head 312 is optimized to read top track 314, or the inverse. In other cases, read transducers on one or both heads 302, 312 may be able to read both top and bottom tracks. This arrangement allows IMR tracks to be recorded with a single writer on each head and a single write driver in the preamp. A single write channel and preamp may switch between each head 302, 312 or multiple preamps and channels may be used in parallel. The use of a single writer per head mitigates the large reader and writer offsets within the heads 302, 312 compared to a configuration with multiple writers, and simplifies a number of other aspects of the heads, such as clearance heaters, number of bond pads, etc.

In other embodiments, the heads 302, 312 may use HAMR or MAMR heads that are configured for different track widths. For example, the geometry of optical components such as near-field transducer (NFT) in a HAMR head can be optimized for larger or smaller hotspot size depending on whether the head is configured for writing bottom or top tracks. This can avoid using different laser powers for different tracks sizes, which could affect life of components such as the NFT at higher power levels. Heads utilizing MAMR can be similarly configured with write poles and spin torque oscillators configured for different track widths.

To fully utilize the IMR tracks, the drive may fill some of bottom tracks first. These tracks may be more difficult to randomly update after being partially overlapped by subsequently written top tracks. As such, some bottom tracks may be reserved for particular types of data, such as sequential data, write-once, read-many, etc. The top tracks can be written after the bottom tracks, and may also be reserved for certain types of data, such as random data, file system metadata, etc. In some cases, the top tracks can be first filled in at locations where the performance is the least important, such as closer to the inner diameter of the disk for areal density gain. Near the outer diameter, which provides the greatest data throughput performance, bottom tracks can be re-written without overhead if outer regions are allocated to never allow top tracks. If top tracks are not written interlacing and partially overlapping the bottom tracks at the allocated outer region, this allows bottom tracks to gain more performance and linear density due to the elimination of margins needed for writing top tracks adjacent to bottom tracks.

Figure 4A:
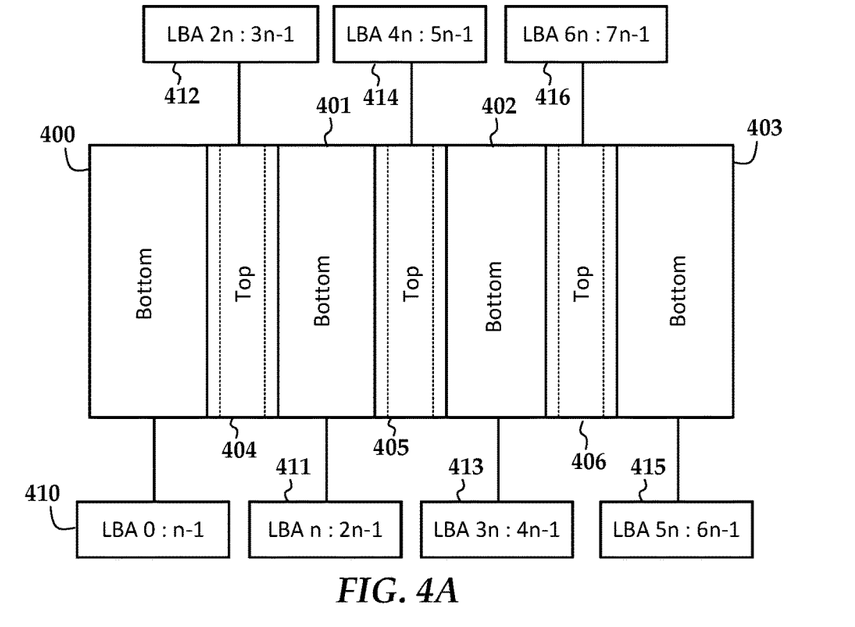
FIGS. 4A, 4B, and 5 are diagrams showing the arrangement of logical block addresses according to example embodiments.

In FIG. 4A, a block diagram shows an example of how sequential blocks can be written according to an example embodiment. A series of bottom tracks 400-403 and top tracks 404-406 are written by different heads as described above. The blocks 410-416 indicate the order in which the first logical block address (LBA) (or sector address) starting at zero is written, ending at address 7n−1 at block 416. Generally, the LBAs are distributed in order between top tracks 404-406 and bottom tracks 400-403, with the first two bottom tracks 400, 401 being first in order, then alternating between top and bottom tracks left to right. Note that this assumes both top tracks 404-406 and bottom tracks 400-403 have the same number of sectors (n). Because the top and bottom tracks may use different linear bit densities, the number of sectors per track may be different, in which case the addresses listed in blocks 410-416 can be adjusted accordingly.

Note that in order to write tracks in parallel, the data for some of addresses 0 to 7n−1 may be buffered before being written. For example, assuming each LBA corresponds to a sector, then if n or more sectors (which corresponds to one or more full tracks in this example) can be buffered, e.g., in a volatile or non-volatile memory, then after bottom tracks 400 and 401 are written, top track 404 can be written at or about the same time as bottom track 402. Simultaneous writing can continue for top track 405 and bottom track 403, where at least top track 405 was previously buffered. Note that reading can be performed in parallel for any two of the tracks 400-406, or more than two if there are more than two heads per surface that can be independently actuated.

Figure 4B:
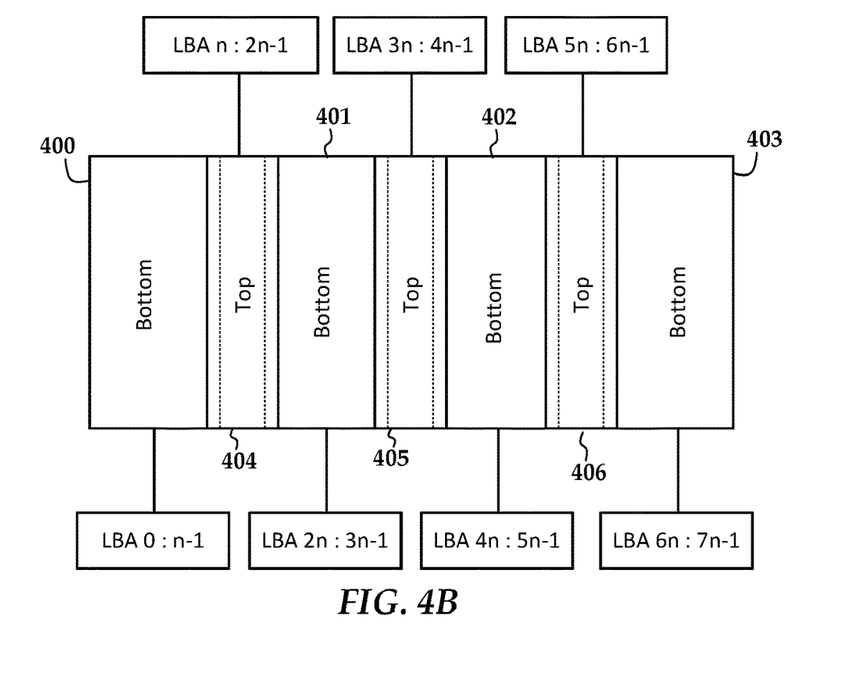

Note that if the drive's firmware arranges the LBAs and write sequences similar to what is shown in FIGS. 4A and 4B, then the writing of top tracks over previously written bottom tracks can be ensured for sequential writes. However, the drive may not have control over the order in which the host writes random data. So if the LBAs are directly mapped to the track sectors as indicated, there may be a situation where the host first writes, e.g., in the range 2n:3n−1 of top track 404, then subsequently writes to LBA n:2n−1 of bottom track 401, which could overwrite data in top track 404. One way to prevent this is to first read and store data from top track 404 (and also top track 405), write bottom track 401, then rewrite top track 404 (and possibly top track 405).

In other embodiments, the LBAs may be distributed in order left to right between top and bottom tracks, as shown in FIG. 4B according to an example embodiment. In this case, bottom track 400 is assigned LBAs 0:n−1, top track 404 is assigned LBAs n:2n−1, track 401 is assigned LBAs 2n:3n−1, etc. Tracks could still be written in parallel by buffering at least one track in this arrangement similar to the example in FIG. 4A. In this case, some of the tracks would be written out of LBA order. For example, if these track were written sequentially, bottom track 400 (LBA 0:n−1) would be written first and data from top track 404 (LBA n:2n−1) would be buffered. Bottom track 401 (LBA 2n:3n−1) would be written next after track, then top track 404 (LBA n:2n−1) would be written from the buffer. This might involve buffering data for the next track (top track 405) while writing top track 404. Subsequent tracks would also be out of LBAs order, e.g., writing bottom track 402 (LBA 4n:5n−1), top track 405 (LBA 3n:4n−1), bottom track 403 (LBA 6n:7n−1), then top track 406 (LBA 5n:6n−1). As with the previous embodiment, the controller will need to have knowledge of which LBAs are mapped to at least bottom tracks so that inadvertent overwriting of top tracks does not occur.

Another way to map addresses to interlaced tracks is by using separate logical block address. This shown in the block diagram of FIG. 5 which shows an LBA mapping according to an example embodiment. A series of bottom tracks 500-503 and top tracks 504-506 are written by different heads as described above. In this case, the top and bottom tracks are assigned to different logical units 507 and 508, which in this example correspond to respective bottom tracks 500-503 and top tracks 504-506. The logical zones 507, 508 may be maintained internally by the drive, or be maintained/managed by the host, and each have separate LBA ranges. The LBAs of logical unit 507 range from 0:4n−1 as indicated by blocks 510-513, and the LBAs of logical unit 508 range from 0:3m−1. In this example, the top tracks 504-506 and bottom tracks 500-503 have different numbers of sectors per track (m and n, respectively). Note that the respective values of n and m may change per radial zone, e.g., larger values of m and n as the zone is located closer to the outer diameter of the disk.

Figure 5:
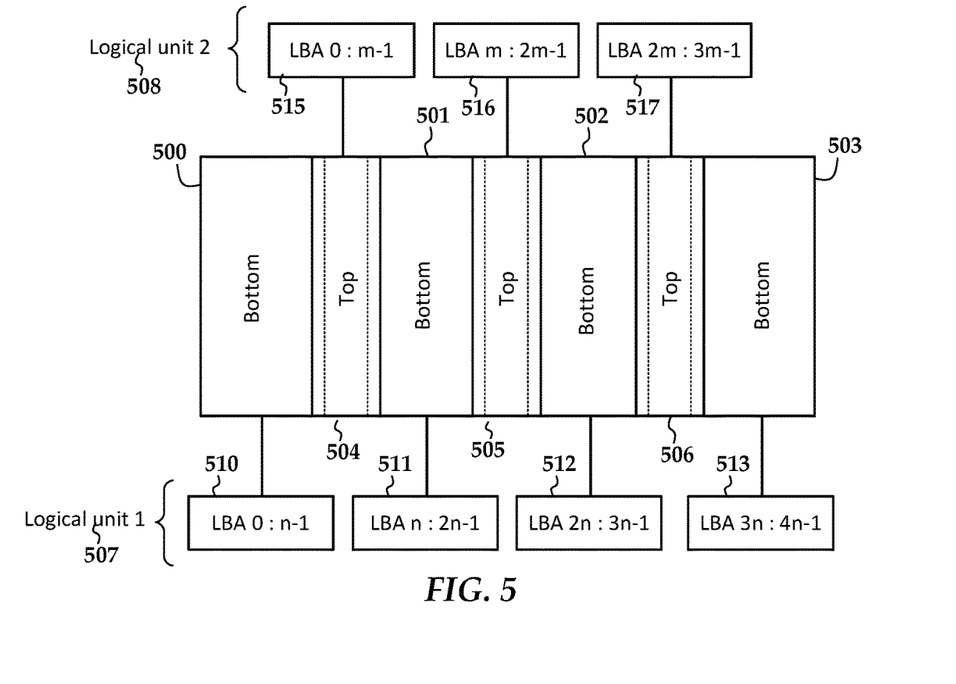

In this arrangement, the heads that write the respective top or bottom tracks can be dedicated to one of the zones 507, 508. The heads can each write independently and simultaneously to the different zones 507, 508, with the caveat that writes to zone 507 will first need to determine if any top tracks are currently written over any bottom tracks that are initially written or rewritten. One way of achieving this is to only write to zone 507 initially, e.g., until the addresses in zone 507 are partially or fully utilized. Thereafter the zones 507 and 508 can both be written to in parallel, assuming writing to zone 507 does not involve overwriting a top track.

Note that the reading and rewriting of top tracks before rewriting bottom tracks is similar in some aspects to memory storage such as flash where memory cells cannot be directly rewritten, but need to be first erased. In both cases, these extra actions are time consuming and can impact write performance. In order to alleviate this penalty, flash memory devices such as solid state drives (SSD) may use a dynamic memory mapping scheme in which logical addresses are mapped to physical addresses through a table. When a rewrite of a currently written logical address is received, the SSD will write the data to a new physical address, mark the old physical address as "dirty," and change the logical-to-physical mapping.

While an IMR drive does not need to erase before writing, the actions taken to preserve top track data are analogous to flash memory in that there is a cost penalty in writing data to bottom tracks that are overlapped by the top track data. Accordingly, in one embodiment, a drive can be arranged into logical zones similar to zones 507 and 508 where some or all are treated similarly to flash media pages. Physical-to-logical address mapping may be dynamically managed by a translation layer.

Logical zones (e.g., zone 508) that correspond to top tracks can be rewritten by one of the heads without concerns of impacting other tracks, and therefore may use a direct mapping of logical-to-physical addresses, e.g., a one-to-one mapping that may use offsets but that does not change logical-to-physical mapping over time. Logical zones (e.g., zone 507) corresponding to bottom tracks may use dynamic logical-to-physical mapping, such that the relationship between logical and physical address is maintained in a data structure such as a lookup table. Note that in some embodiments, it may be desirable to make both types of logical zones dynamically mapped, enabling efficient arrangement of data and garbage collection as described below.

For bottom tracks in the dynamically-mapped zones that are not yet covered by top tracks, data updates can proceed similar to a conventional drive by directly overwriting sectors. For an update in these zones that affects a bottom track overlapped by one or more previously written top tracks, the writing may involve selecting another track in the same or different zone, writing the updates to that new location, and updating the mapping structures. The old bottom track sectors can be marked as "dirty," and subject to recovery in a garbage collection operation before being written to again. A garbage collection operation may move clean sectors from this zone to another location, then make all of the bottom tracks in the zone available for receiving new data. Note that after this garbage collection, the tracks (being bottom tracks) cannot be directly written to if currently used top track data is currently overlapping the bottom tracks.

In some cases, garbage collection may involve, in a selected zone, moving all the top track data to bottom tracks, and then making the top tracks in the selected zone available for new data. This would involve dynamically mapping addresses of both the top and bottom track logical zones so that the rewritten data could be accessed at the new physical locations on the bottom tracks via the old logical addresses.

Note that unlike flash memory, there could be a penalty in a disk drive if data moved to different physical sectors causes fragmenting of files. This fragmentation could impact the access times for such files, because it could involve multiple seeks depending on the level of fragmentation. Additionally, if the fragments are moved a significant distance away in terms of physical addresses, the length of the seek (number of tracks traversed) would increase as well further impacting access times. Therefore, it may be desirable to ensure that any remapping of logical-to-physical addresses utilize a cost function that minimizes differences between the original and new physical addresses to minimize seek distances. As noted above, assuming both heads could read both logical zones, then this latency could be reduced by reading the different segments using different heads.

Figure 6:
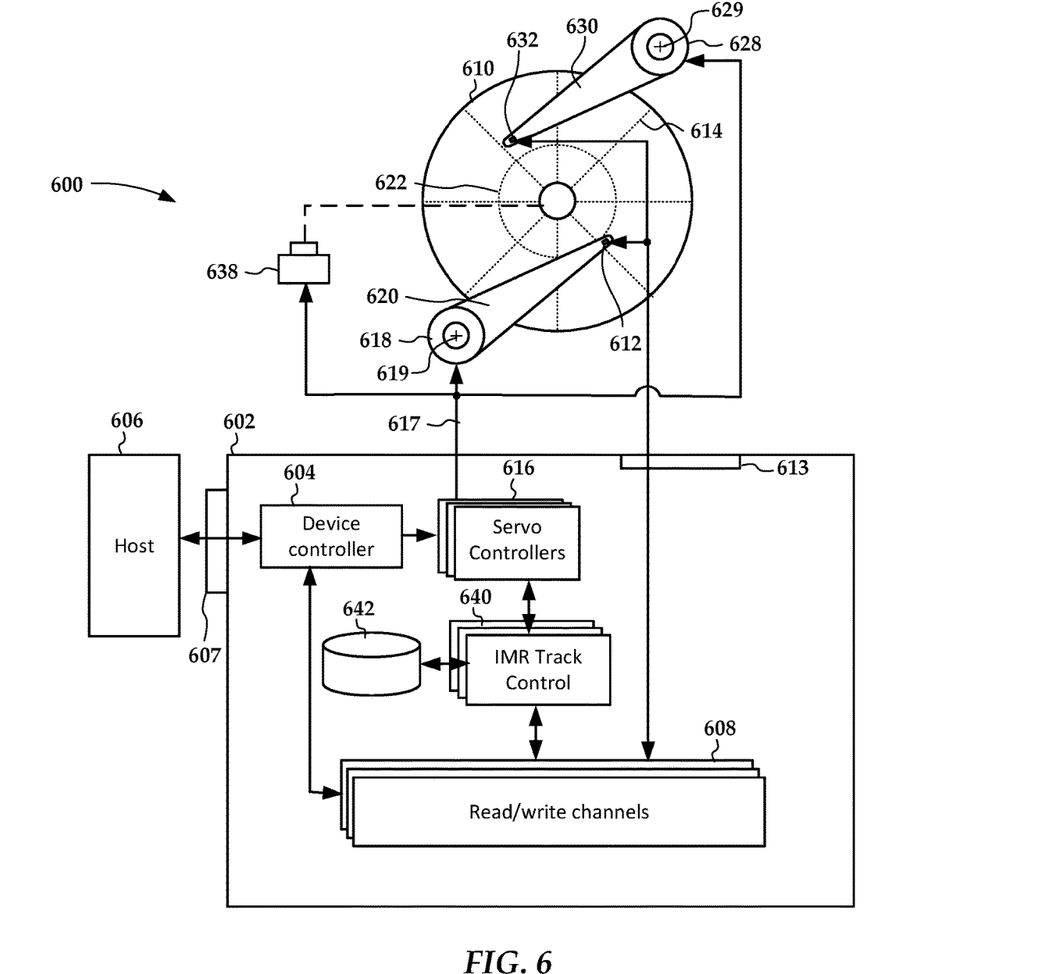
FIG. 6 is a block diagram of a disk drive apparatus according to an example embodiment.

In FIG. 6, a block diagram illustrates a data storage drive 600 that utilizes one or more actuators according to example embodiments. The apparatus includes circuitry 602 such as one or more device controllers 604 that process read and write commands and associated data from a host device 606 via a host interface 607. The host interface 607 includes circuitry that enables electronic communications via standard bus protocols (e.g., SATA, SAS, PCI, etc.). The host device 606 may include any electronic device that can be communicatively coupled to store and retrieve data from a data storage device, e.g., a computer, a server, a storage controller. The device controller 604 is coupled to one or more read/write channels 608 that read from and write to surfaces of one or more magnetic disks 610.

The read/write channels 608 generally convert data between the digital signals processed by the device controller 604 and the analog signals conducted through two or more heads 612, 632 during read operations. The two or more heads 612, 632 each may include respective read transducers capable of concurrently reading the disk 610, e.g., at least two heads reading from the same surface. The read transducers may be configured to read in any mode, such as conventional single-track with single reader, or various TDMR modes like single track with multiple readers (MSMR) or multi-track with multiple readers (TDMR-MT). The two or more heads 612, 632 may also include respective write transducers that concurrently write to the disk 610. The write transducers may be CMR, HAMR, MAMR, and may write in various track configurations, such as conventional, SMR, and IMR. On at least one surface, heads 612, 632 are configured for writing different width tracks corresponding to top and bottom IMR tracks.

The read/write channels 608 may include analog and digital circuitry such as digital-to-analog converters, analog-to-digital converters, detectors, timing-recovery units, error correction units, etc. The read/write channels 608 coupled to the heads 612, 632 via interface circuitry 613 that may include preamplifiers, filters, etc. As shown in the figure, the read/write channels 608 are capable of concurrently processing one of a plurality of data streams from the multiple heads 612, 632.

In addition to processing user data, the read/write channels 608 read servo data from servo marks 614 on the magnetic disk 610 via the read/write heads 612, 632. The servo data are sent to one or more servo controllers 616 that use the data to provide position control signals 617 to one or more actuators, as represented by voice coil motors (VCMs) 618. The VCM 618 rotates an arm 620 upon which the read/write heads 612 are mounted in response to the control signals 617. The position control signals 617 may also be sent to microactuators (not shown) that individually control each of the heads 612, e.g., causing small displacements at each read/write head.

The VCM 618 may be a stacked or split actuator, in which case two VCM parts are configured to independently rotate different arms about a common axis 619. In such a case, other heads (not shown) will access data on the disks simultaneously with that of heads 612, and these other heads may be coupled to circuitry 602 similar to illustrated head 632. A second actuator, e.g., VCM 628, may independently and simultaneously rotate a second arm 630 about a second axis 629. Corresponding heads 632 may be rotated by the VCM 628 and may operate simultaneously with the heads 612 under commands from the one or more servo controllers 616. A microactuator (not shown) may also be used on arm 630 to cause fine displacements of head 632.

An IMR track control module 640 manages the assignment of top and bottom tracks to heads 612, 632, which are each optimized for at least writing to different tracks widths (and linear bit densities) associated with one of the top and bottom track dimensions. The IMR track control module 640 divides incoming data streams, e.g., based on LBAs of the data, to one of the heads 612, 632 where they can be written in parallel and/or in series. For example, for a large sequential write, the IMR track control module may determine a write pattern and offset that allows the heads 612, 632 to write both a bottom track and a partially overlapping top track simultaneously. The IMR track control module 640 may be accomplish these operations via communications with the read/write channels 608 and servo controllers 616.

The IMR track control module 640 may also coordinate efforts to ensure that top track data doesn't get overwritten. For example, if a bottom track update would result in a top track being overwritten, the module 640 could cause one or both heads to read any data that might be overwritten, buffer the data, perform the bottom track writes via one of the heads 612, 632, then follow up with rewrites of the top track data from the buffer via another of the heads 612, 632.

If the drive 600 uses different logical zones associated with the heads 612, 632 (e.g., top track zones and bottom track zones) and/or uses dynamic logical-to-physical mapping, the IMR track control module 640 may be configured to manage these aspects. For example, the different logical zones could be presented as different logical storage devices (e.g., LUNs) to the host 606. The module 640 could direct write operations to the different heads 612, 632 depending on the logical zone identifier, and also manage other aspects, such as ensuring that updates to bottom track zones do not affect top track zones.

The IMR control module 640 also manages reading from the IMR tracks. In some configurations, the heads 612, 632 may be configured to at least read back the tracks that were written by the same head 612, 632. In some cases, one or both of the heads 612, 632 may include one or more read transducers that are configured to read both the top and bottom tracks. For example, in configurations where the heads 612, 632 are dedicated to different logical LBA zones for writing, the heads 612, 632 may be used for reading from any logical LBA zones which can potentially increase read performance both in terms of throughput (e.g., two heads providing two simultaneous streams of data) and latency (e.g., one head seeking ahead to the next target track while the other head is reading data).

Figure 7:
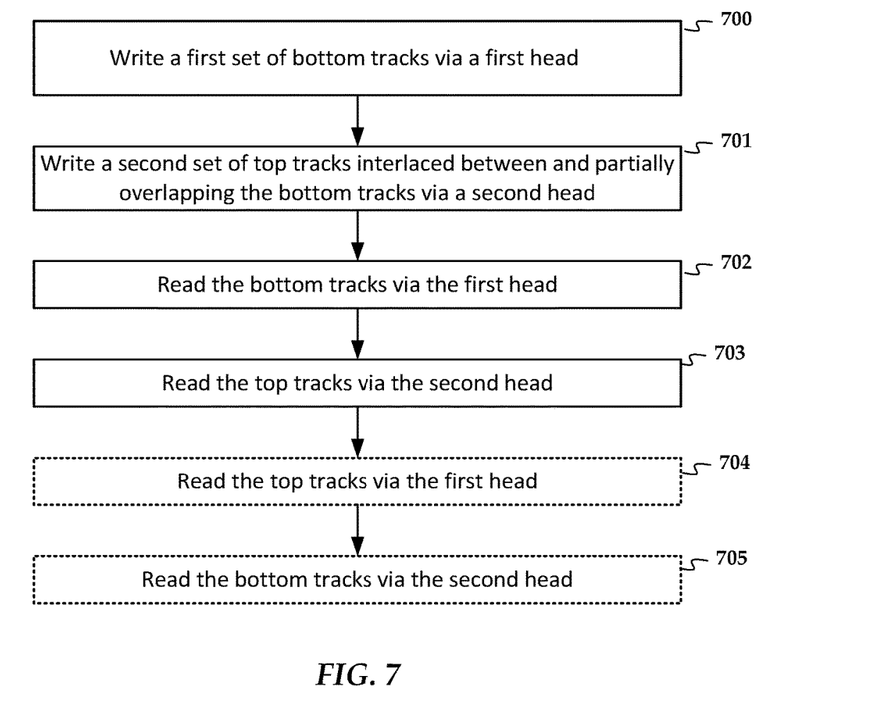
FIG. 7 is a flowchart of a method according to an example embodiment.

In FIG. 7, a flowchart shows a method according to an example embodiment. The method involves writing 700 a first set of bottom tracks via a first head that is moved via a first actuator over a surface of a disk. A second set of top tracks interlaced between and partially overlapping the bottom tracks is written 701 via a second head that is moved via a second actuator over the surface of the disk independently of the first actuator and first head. The bottom tracks are read 702 via the first head and the top tracks are read 703 via the second head. Optionally, the top tracks can be read 704 via the first head and/or the bottom tracks read 705 via the second head.

The various embodiments described above may be implemented using circuitry, firmware, and/or software modules that interact to provide particular results. One of skill in the relevant arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:
1. A method, comprising:
writing a first set of bottom tracks via a first head that is moved via a first actuator over a surface of a disk; and
writing a second set of top tracks interlaced between and partially overlapping the bottom tracks via a second head that is moved via a second actuator over the surface of the disk independently of the first actuator and first head, the first and second actuators rotating about separate axes such that the first and second heads are rotationally offset from each other on the disk surface, the rotational offset allowing the first and second head to write both the bottom tracks and the top tracks simultaneously.
2. The method of claim 1, wherein the first head is configured to write a wider track width than the second head.
3. The method of claim 2, wherein the first head is configured to write a different linear bit density than the second head.
4. The method of claim 2, wherein the first and second heads comprise heat-assisted magnetic recording heads, and wherein the first head records with a larger hotspot than the second head.
5. The method of claim 2, wherein the first and second heads comprise one or more of conventional magnetic recording heads and microwave-assisted magnetic recording heads, and wherein the first head records with a larger write pole than the second head.
6. The method of claim 1, wherein logical block addresses are distributed in order between the bottom tracks and the top tracks.
7. The method of claim 1, wherein the top tracks and bottom tracks are arranged as different logical zones having separate logical block address spaces within each zone.
8. The method of claim 1, wherein writing the top and bottom tracks simultaneously comprises writing a full bottom track and a partial, adjacent bottom track before writing the top track between the full bottom track and a partial, adjacent bottom track, the top track being written simultaneously with the partial, adjacent bottom track.

9. The method of claim 1, wherein at least one of the top tracks partially overlap two adjacent bottom tracks.

10. The method of claim 1, further comprising reading back the top tracks from both the first and second heads.

11. The method of claim 1, further comprising reading back the bottom tracks from both the first and second heads.

12. The method of claim 1, wherein a subset of the bottom tracks near an outer diameter of disk is allocated such that top tracks are not written interlaced between and partially overlapping the subset of the bottom tracks.

13. An apparatus, comprising:
   interface circuitry operable to communicate with first and second heads and with first and second actuators that respectively move the first and second heads independently over a surface of a disk the first and second actuators rotating about separate axes such that the first and second heads are rotationally offset from each other on the disk surface; and
   a controller coupled to the interface circuitry and configured to:
      write a first set of bottom tracks on the disk via the first head; and
      write a second set of top tracks interlaced with and partially overlapping the bottom tracks via the second head, the rotational offset allowing the first and second head to write both the bottom tracks and the top tracks simultaneously.

14. The apparatus of claim 13, wherein the first head is configured to write a wider track width than the second head.

15. The apparatus of claim 14, wherein the first head is configured to write a different linear bit density than the second head.

16. The apparatus of claim 13, wherein logical block addresses are distributed in order between the bottom tracks and the top tracks.

17. The apparatus of claim 13, wherein the top tracks and bottom tracks are arranged as different logical zones having separate logical block address spaces within each zone.

18. The apparatus of claim 13, wherein writing the top and bottom tracks simultaneously comprises writing a full bottom track and a partial, adjacent bottom track before writing the top track between the full bottom track and a partial, adjacent bottom track, the top track being written simultaneously with the partial, adjacent bottom track.

19. A system comprising:
   a first head movable over a surface of a disk via a first actuator;
   a second head movable over the surface via a second actuator independently of the first actuator, the first and second actuators rotating about separate axes such that the first and second heads are rotationally offset from each other on the disk surface;
   interface circuitry coupled to the first and second heads and the first and second actuators; and
   a controller coupled to the interface circuitry and configured to:
      write a first set of bottom tracks on the disk via the first head, the bottom tracks having a first width; and
      write a second set of top tracks interlaced with and partially overlapping the bottom tracks via the second head, the top tracks having a second width different than the first width, the rotational offset allowing the first and second head to write both the bottom tracks and the too tracks simultaneously.

20. The system of claim 19, wherein the first width is greater than the second width.

* * * * *